US011019079B2

(12) United States Patent
Goutal

(10) Patent No.: US 11,019,079 B2
(45) Date of Patent: *May 25, 2021

(54) DETECTION OF EMAIL SPOOFING AND SPEAR PHISHING ATTACKS

(71) Applicant: Vade Secure, Inc., San Francisco, CA (US)

(72) Inventor: Sebastien Goutal, San Francisco, CA (US)

(73) Assignee: VADE SECURE INC., San Francisco, CA (US)

( * ) Notice: Subject to any disclaimer, the term of this patent is extended or adjusted under 35 U.S.C. 154(b) by 210 days.

This patent is subject to a terminal disclaimer.

(21) Appl. No.: 16/353,995

(22) Filed: Mar. 14, 2019

(65) Prior Publication Data
US 2020/0084228 A1 Mar. 12, 2020

Related U.S. Application Data

(63) Continuation of application No. 15/466,588, filed on Mar. 22, 2017, now Pat. No. 10,284,579.

(51) Int. Cl.
*H04L 29/06* (2006.01)
*H04L 12/58* (2006.01)

(52) U.S. Cl.
CPC .......... *H04L 63/1416* (2013.01); *H04L 51/00* (2013.01); *H04L 51/12* (2013.01); *H04L 63/1483* (2013.01); *H04L 63/1433* (2013.01)

(58) Field of Classification Search
CPC ............. H04L 63/1483; H04L 63/1416; H04L 63/1425; H04L 63/1433; H04L 51/00; H04L 51/12

(Continued)

(56) References Cited

U.S. PATENT DOCUMENTS

2004/0260922 A1* 12/2004 Goodman .............. H04L 51/12 713/154
2005/0021649 A1* 1/2005 Goodman .............. H04L 51/12 709/207

(Continued)

OTHER PUBLICATIONS

Zhu, Yuanchun, and Ying Tan. "A local-concentration-based feature extraction approach for spam filtering." IEEE Transactions on Information Forensics and Security 6.2 (2010): 486-497. 2011 (Year: 2011).*

(Continued)

*Primary Examiner* — Syed A Zaidi
(74) *Attorney, Agent, or Firm* — Young Law Firm, P.C.

(57) ABSTRACT

A computer-implemented method of detecting an email spoofing and spear phishing attack may comprise generating a contact model of a sender of emails; determining, by a hardware processor, a statistical dispersion of the generated contact model that is indicative of a spread of a distribution of data in the generated model and receiving, over a computer network, an email from the sender. If the determined statistical dispersion is lower than a dispersion threshold, the received email may be evaluated in the processor against a plurality of conditions associated with email spoofing and spear phishing attacks, using the generated contact model, to generate a features vector that is constituted of a plurality of numeric values and a plurality of dispersion values between 0 and 1, and using at least the generated features vector to classify with a supervised learning algorithm the received email as a likely legitimate email or as a likely malicious email spear phishing attack; and notifying a recipient of the email when the received email is classified as a likely malicious email spear phishing attack.

22 Claims, 8 Drawing Sheets

(58) Field of Classification Search
USPC .......................................................... 726/23
See application file for complete search history.

(56) References Cited

U.S. PATENT DOCUMENTS

2011/0173142 A1* 7/2011 Dasgupta ............... G06N 20/10
706/12
2013/0247192 A1* 9/2013 Krasser ............... H04L 63/1425
726/23

OTHER PUBLICATIONS

Tan, Ying, et al. "Artificial immune system based methods for spam filtering." 2013 IEEE International Symposium on Circuits and Systems (ISCAS). IEEE, 2013. (Year: 2013).*
NPL Search Terms (Year: 2021).*
NPL Search Terms (Year: 2020).*
Ma, Liping, et al. "Detecting phishing emails using hybrid features." 2009 Symposia and Workshops on Ubiquitous, Autonomic and Trusted Computing. IEEE, 2009. (Year: 2009).*

* cited by examiner

| Type | Feature | Description |
|---|---|---|
| BIN | KNOWN_IP_ADDRESS | The IP address that has initiated the SMTP connection is in KNOWN_IP_ADDRESS_LIST. |
| DISP | KNOWN_IP_ADDRESS_DISP | Dispersion of KNOWN_IP_ADDRESS_LIST. |
| BIN | KNOWN_CITY | The city associated to the IP address that has initiated the SMTP connection is in KNOWN_CITY_LIST. |
| DISP | KNOWN_CITY_DISP | Dispersion of KNOWN_CITY_LIST. |
| BIN | KNOWN_MUA | The MUA used to compose the email is in KNOWN_MUA_LIST. We will use the simplified name for the identification of the MUA.<br>Example:<br>IPHONE_MAIL<br>IPAD_MAIL<br>OSX_MAIL<br>LINUX_THUNDERBIRD |
| DISP | KNOWN_MUA_DISP | Dispersion of KNOWN_MUA_LIST. |
| BIN | KNOWN_MUA_DISPLAY_NAME | The display name extracted from *From* header matches the display name of the identified MUA. See KNOWN_MUA. |
| BIN | KNOWN_MUA_SIGNATURE | The signature extracted from the body matches the signature of the identified MUA. See KNOWN_MUA. |
| BIN | KNOWN_MUA_DEFAULT_FONT | The font extracted from the *text/html* part of the body of the email matches the default font of the identified MUA. See KNOWN_MUA. |
| BIN | KNOWN_MUA_CONTENT_LANGUAGE | The language extracted from *Content-Language* header matches the language of the identified MUA. See KNOWN_MUA. |
| BIN | NEW_MESSAGE | The email is a newly composed message i.e. the email is neither a reply to a previous message nor a forward of an existing message.<br>In the case of a reply or a forward, the email can take attributes - such as the font and the language - of the existing message. See KNOWN_MUA_DEFAULT_FONT and KNOWN_MUA_CONTENT_LANGUAGE. |

*FIG. 4A*

| | | |
|---|---|---|
| BIN | TEXT_HTML_PART | The email body has a *text/html* part. A *text/html* part in the body is required to extract the font. See KNOWN_MUA_DEFAULT_FONT. |
| BIN | WHP_IP_ADDRESS | The IP address that has initiated the SMTP connection belongs to a web hosting provider (GoDaddy, OVH, 1&1...). Web hosting providers are often abused by fraudsters to send malicious emails such a spear phishing attacks.<br><br>A web hosting provider IP address can be identified in two different ways:<br>• Analyze and match the reverse DNS of the IP address with a known pattern,<br>• Match the IP address with of list of IP ranges that belong to the web hosting provider. |
| BIN | DIFFERENT_REPLY_TO | The email address in the *Reply-To* header [10] does not match the email address in the *From* header. In the case of a spear phishing, the fraudster often set a different email address in *Reply-To* header : if the victim replies to the email, then its reply will not go to the person whose email has been spoofed. |
| BIN | DIFFERENT_RETURN_PATH | The email address in the *Return-Path* header [10] does not match the email address in the *From* header. The *Return-Path* header contains the email address that will receive a bounce message [13] in the case of a delivery issue. The *Return-Path* header is added to the received email by the MTA and the MTA uses the email address of the *MAIL FROM* SMTP command [2]. In the case of a spear phishing, the fraudster often sets an email address in the *MAIL FROM* SMTP command that is different from the email address in the *From* header: as a consequence, the email addresses in the *Return-Path* and *From* headers are different. |
| BIN | SINGLE_RECIPIENT | There is one recipient in *To* header and no recipient in *Cc* and *Bcc* headers. This recipient is the *main recipient*. In the case of a spear |

*FIG. 4B*

| | | |
|---|---|---|
| | | phishing attack, it is common that only one person is targeted. If several persons were targeted, they would be more alert and more prone to detect the scam. |
| BIN | *URGENCY_IN_SUBJECT* | The email *Subject* header contains a keyword that creates a sense of urgency: *urgent*, *important*... A large number of spear phishing attacks create a sense of urgency so that the victim acts immediately. See the *CEO fraud* example. |
| BIN | *SUSPICIOUS_TEXT* | The email body contains suspicious topics: wire transfer, disclosure of sensitive and/or confidential data (contracts, internal documents, bank account numbers, social security numbers, W-2 tax records, list of logins or passwords...)... |
| BIN | *EXTERNAL_DATA* | The email body contains at least one *external data*: an email address, a telephone number, an url or a *dynamic file* attached.<br><br>It is important to note that the signature in the body is ignored as it may contain an email address, telephone numbers and urls.<br><br>A *dynamic file* is a file that may contain dynamic content that can be harmful. Examples of *dynamic files* are PE files [14], APK files [15], PDF files, Microsoft Office files or HTML files. Such files will be identified by their media type [16].<br><br>In this case of a spear phishing attack, this *external data* can be the next step of the attack or the payload: a phishing url that will capture the victim credentials, a file that contains a malware... |

*FIG. 4C*

| Threat | Features |
|---|---|
| Features used to detect Email spoofing | KNOWN_IP_ADDRESS<br>KNOWN_IP_ADDRESS_DISP<br>KNOWN_CITY<br>KNOWN_CITY_DISP<br>KNOWN_MUA<br>KNOWN_MUA_DISP<br>KNOWN_MUA_DISPLAY_NAME<br>KNOWN_MUA_SIGNATURE<br>KNOWN_MUA_DEFAULT_FONT<br>KNOWN_MUA_CONTENT_LANGUAGE<br>NEW_MESSAGE<br>TEXT_HTML_PART |
| Features used to detect Spear phishing | WHP_IP_ADDRESS<br>DIFFERENT_REPLY_TO<br>DIFFERENT_RETURN_PATH<br>SINGLE_RECIPIENT<br>URGENCY_IN_SUBJECT<br>SUSPICIOUS_TEXT<br>EXTERNAL_DATA |

*FIG. 5*

DETECTION OF EMAIL SPOOFING AND SPEAR PHISHING ATTACKS

CROSS-REFERENCE TO RELATED APPLICATIONS

The present application is a Continuation of co-pending and commonly assigned U.S. patent application Ser. No. 15/466,588 filed on Mar. 22, 2017 and entitled "DETECTION OF EMAIL SPOOFING AND SPEAR PHISHING ATTACKS", which is hereby incorporated herein in its entirety.

BACKGROUND

Whereas phishing is now a threat that is well known by the Internet ecosystem and the security industry, a more advanced and pernicious threat has appeared recently, and this threat is known as spear phishing.

Spear phishing has the following features:

Spear phishing targets enterprises, and especially small and medium-sized enterprises. The victim targeted is someone who has access to sensitive information, such as a C-level executive or an accountant.

The attack is prepared meticulously. The attacker performs a thorough study of the enterprise and the victim, drawing from sources of information such as social media (LinkedIn, Facebook, Twitter . . . ), corporate website, blogs and corporate media. Such sources are often a treasure trove of valuable information. The attacker will use this information to build an attack that will make sense and appear legitimate to the victim.

The email will be send to the victim by an allegedly trusted person. In the case of spear phishing, there is always impersonation of a trusted person. A well-known kind of impersonation by email is called email spoofing.

The payload of the spear phishing attack can be one of the following:

A malicious file attached; or

A malicious Uniform Resource Locator (url).

The text itself, designed to lead the victim to carry out an action (wire transfer, sending of confidential documents, etc.)

The spear phishing attack is unique and is tailored specifically to the targeted enterprise and victim. A known example of spear phishing is called CEO fraud. The CEO fraud is a business email scam in which the attacker spoofs an email from the CEO of a company and tricks another person of this company—typically the accountant—to perform an action that will benefit the fraudsters, such as wiring funds or disclosing sensitive information. The CEO fraud is a typical example of a spear phishing attack where the attack is prepared meticulously so that the victim believes that the email originates from the CEO himself. For example, in the case of a wire transfer, the attacker will provide the motivation for the wire transfer. Here is an example:

From: John Miller <john.miller@company.com>
To: Jessica Lee <jessica.lee@company.com>
Subject: Urgent matter
Jessica,
I just met one of our provider at the RSA conference. They have a pending invoice from last year that got lost. I have attached the invoice. Can you initiate the wire transfer asap? It is very important.
Thx
John
Sent from my iPhone In this example, the attacker knows that John is the CEO and Jessica the accountant. He also knows the email addresses of both. It is quite trivial for the attacker to find this information, as the company website and social media websites such as LinkedIn provide much, if not all, of the needed information. Furthermore, the attacker knows that John Miller is at the RSA conference because this information was posted on the company Twitter account.

As previously stated, spear phishing attack relies on impersonation. In contrast, email spoofing is the creation of email messages with a forged sender address in the From header of the email. As surprising as it may sound, core email protocols do not provide a mechanism for authentication and thus allow the creation of email messages with a forged sender address.

To address this critical issue, the software industry has developed technologies such as Sender Policy Framework (SPF), DomainKeys Identified Mail (DKIM) or more recently Domain-based Message Authentication, Reporting and Conformance (DMARC). However, even if the adoption of these technologies is increasing, a vast portion of the email traffic is still not protected. The main reason for the non-adoption of these technologies is due to the large amount of work that is required to properly configure SPF, DKIM and/or DMARC, which typically depends of the complexity of the email provider infrastructure. Moreover, for even modestly complex environments, the cost of deploying these technologies may be considered to be prohibitive for the email provider. For example, Google, AOL and Yahoo! have successfully deployed these technologies. However, other major email providers have not and may never do so. Consequently, an important number of end users remain vulnerable to email spoofing.

BRIEF DESCRIPTION OF THE DRAWINGS

FIG. 4A is a table illustrating aspects of computer-implemented methods, devices and systems, according to one embodiment.

FIG. 4B is a table illustrating aspects of computer-implemented methods, devices and systems, according to one embodiment.

FIG. 4C is a table illustrating aspects of computer-implemented methods, devices and systems, according to one embodiment.

FIG. 5 is a table illustrating aspects of computer-implemented methods, devices and systems, according to one embodiment.

DETAILED DESCRIPTION

Herein, computer-implemented methods, devices and systems are presented that will thwart spear phishing attacks and email spoofing. For ease of reference, such methods, devices and systems are collectively referred to herein by the acronym ESPL (Email Spoofing & spear phishing Protection Layer).

Definitions

Organization domain is the email domain of the organization protected by ESPL technology.

Contacts are email addresses that exchange priority emails with the organization domain. Contacts are constituted of internal contacts and external contacts. Internal contacts are email addresses that belong to the organization domain. External contacts are email addresses that do not belong to the organization domain.

A priority email is an email that has been considered as legitimate by previous email filters and that has not been sent by an automated process. A typical example of priority email is a person-to-person email. All other types of emails will be ignored: spam, advertisements, newsletters, social networks notifications, electronic commerce notifications (such as invoices, booking or purchase confirmation, electronic tickets, parcel tracking). These may be processed using other, existing methods.

ESPL

Both internal contacts and external contacts can be spoofed by a fraudster. ESPL's purpose includes protecting internal contacts of the organization domain from spear phishing attacks that rely on the spoofing of an internal contact or external contact of the organization domain.

To achieve this purpose and according to one embodiment, ESPL may build a model for every contact of the organization domain. This model may be built by analyzing inbound and outbound email traffic of the organization domain. The period of time during which ESPL acquires data from email traffic to build a model of the contact is called learning phase. According to one embodiment, when enough data is acquired to build the model of the contact; that is, when ESPL has enough data to detect an impersonation of the contact, ESPL may switch from the learning phase to a protection phase.

Deployment

The enterprise email filtering described and shown herein may be implemented, according to one embodiment, as an on-premise email filtering gateway and, according to one embodiment, as an email filtering service in the executing on remote servers (i.e., the cloud).

Both implementations include ESPL technology. Herein, the phrase ESPL component denotes each deployment of the ESPL technology. There are as many ESPL components as there are several instances of the gateway and cloud implementations.

Figure 1:
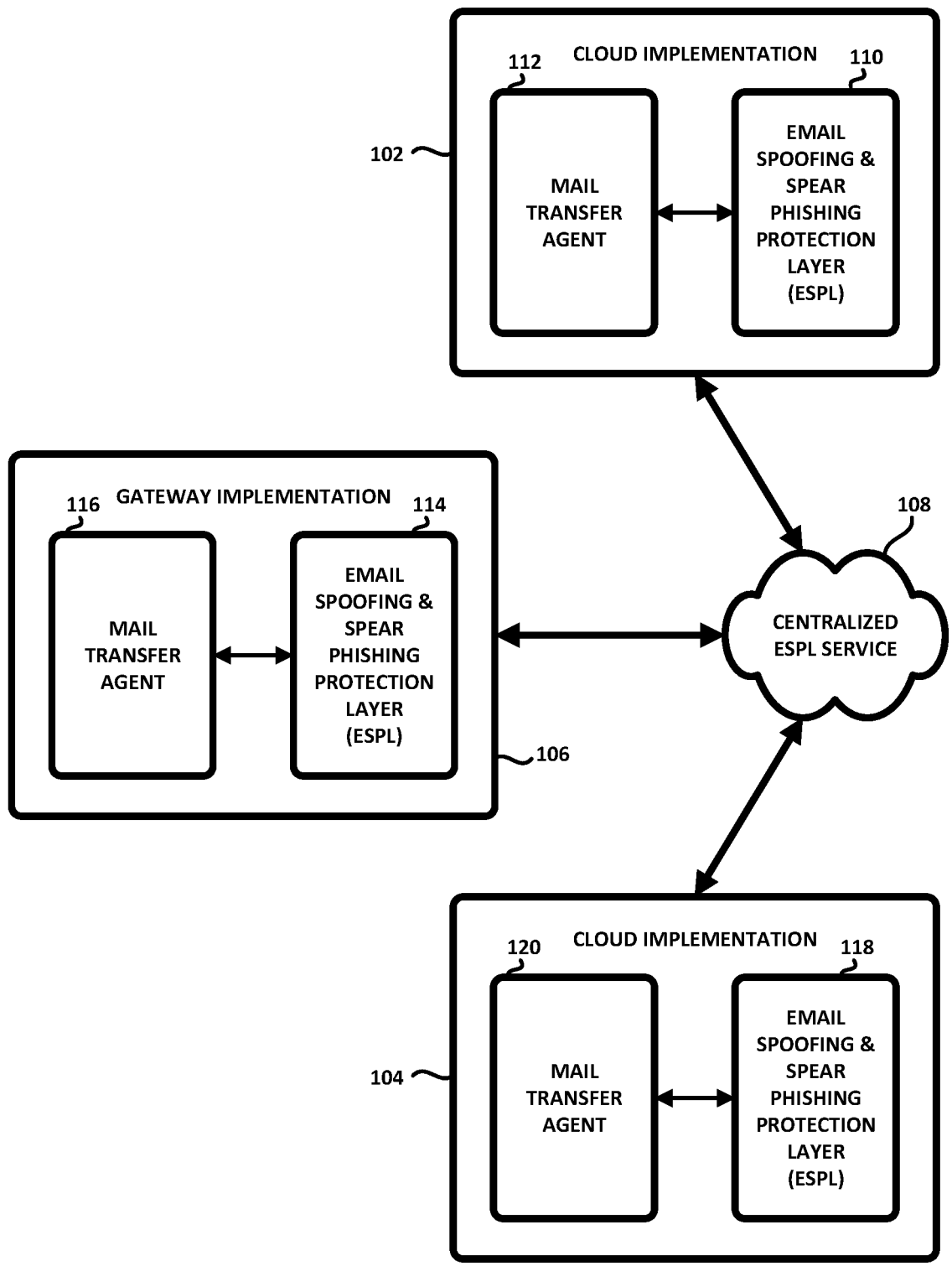
FIG. 1 is a block diagram illustrating aspects of computer-implemented methods, devices and systems, according to one embodiment.

FIG. 1 is a block diagram illustrating aspects of computer-implemented methods, devices and systems, according to one embodiment. As shown therein, two cloud implementations 102, 104 and one gateway implementation 106 may be coupled, over a computer network (not explicitly shown in FIG. 1, but present), to a centralized ESPL service 108. Both the cloud implementations 102, 104 and the gateway implementation 106 may be configured, according to one embodiment, to include an ESPL component or layer and a Mail Transfer Agent (MTA). Indeed, the cloud implementation 102 may be configured to include ESPL component 110 that communicates with a MTA 112, the gateway implementation 114 may be configured to include an ESPL component 114 that communicates with a MTA 116 and the cloud implementation 104 may be configured to include an ESPL component 118 that communicates with a MTA 120.

Each ESPL component 110, 114, 118, depending upon the implementation, may be configured to communicate:

with its email server (also known as the MTA) 112, 116 and 120, respectively; and with a centralized ESPL service 108 in the cloud.

Figure 2A:
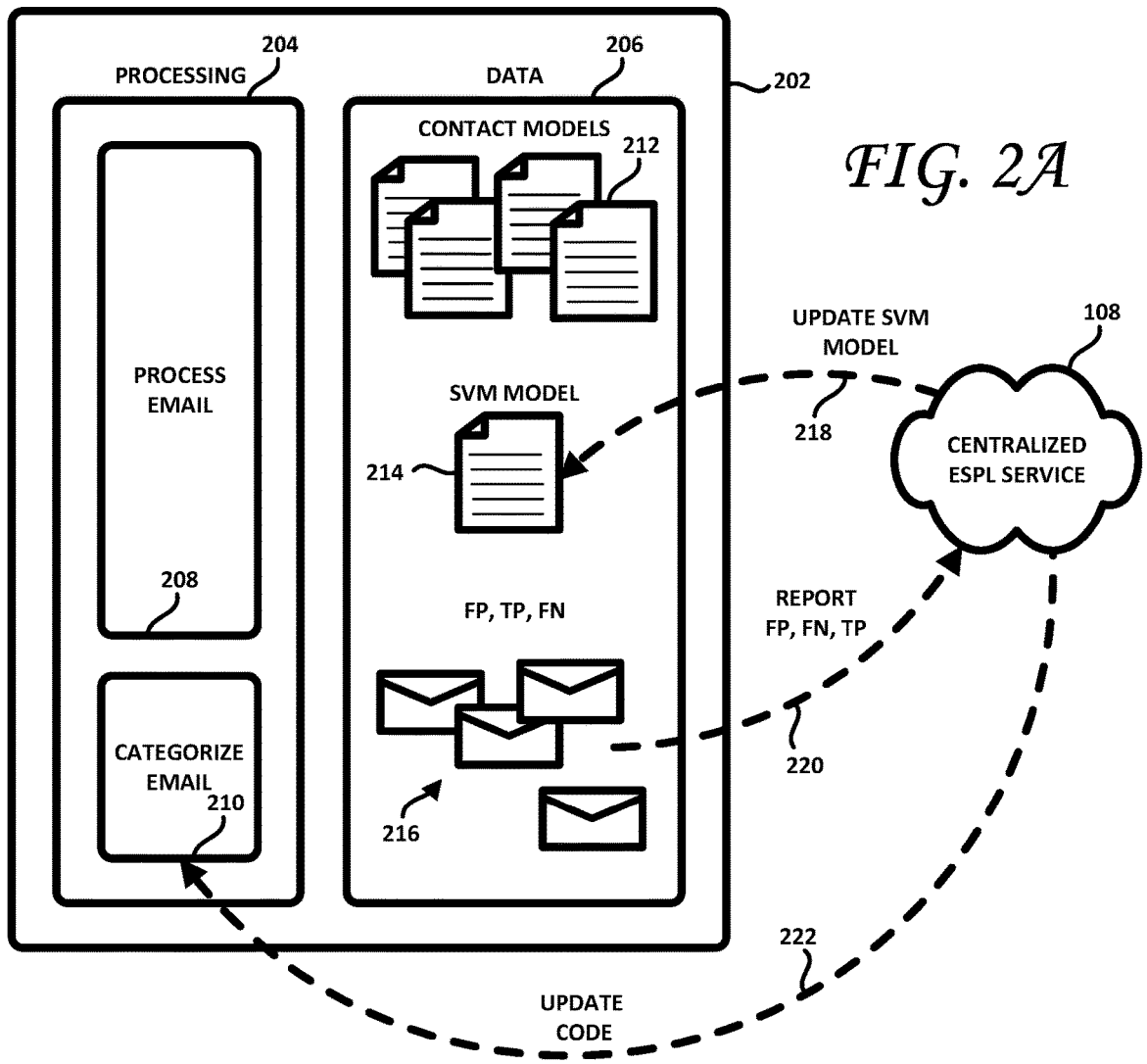
FIG. 2A is a block diagram illustrating aspects of computer-implemented methods, devices and systems, according to one embodiment.

FIG. 2A is a block diagram illustrating aspects of computer-implemented methods, devices and systems, according to one embodiment. It is useful at this juncture, to set out a few definitions:

True Positive (TP): a malicious email that has been classified as malicious by ESPL;

False Positive (FP): a legitimate email that has been classified as malicious by ESPL;

True Negative (TN): a legitimate email that has been classified as legitimate by ESPL; and False Negative (FN): a malicious email that has been classified as legitimate by ESPL.

As shown in FIG. 2A, ESPL component 202 (also shown in FIGS. 1 at 110, 114 and 118) is configured, as shown previously, to communicate with the centralized ESPL service 108 over a computer network that may include, for example, the Internet and/or other public or private networks. The ESPL component 202 may be characterized, according to one embodiment, as comprising a processing portion 204 and a data portion 206. The processing portion 204 may comprise structure and functionality to process emails (receive, generate and send emails, among other functionality), as shown at 208 and to categorize email, as shown at 210. The processing portion 204, for example, may be embodied in one or more processors (an exemplar of which is shown at 602 in FIG. 6) configured, according to computer-readable instructions, to carry out the functionality of FIG. 3 described hereunder and described throughout the remaining portion of the present disclosure. As shown at 210, the processing portion 204 may also be configured to classify received email, as described in detail herein. The ESPL component 202 may also be configured to build, maintain and update contact models 212, SVM models 214 and to report FP, TP and FN emails 216 to the centralized ESPL service 108 as shown at 220. During the protection phase, as shown in FIG. 2A, the centralized ESPL service 108, as shown at 218 and 222, may also be configured to update the SVM model 214 and update the code that causes the processing portion 204 to categorize incoming email, as shown at 222 and as described herein below.

Therefore, as shown in FIG. 2A, the centralized ESPL service 108, according to one embodiment, may be configured to, among other tasks:

to collect FP, FN and TP from all ESPL components to improve ESPL technology, as shown at 220; and to update the ESPL components 110, 114, 120 (Code update 222, update SVM model as shown at 218).

Processing of Inbound Email Traffic

The terms True Positive (TP), True Negative (TN), False Positive (FP) and False Negative (FN) are widely used in binary classification problems. FN and FP may be detected by ESPL according to one embodiment, through end-user feedback. According to one embodiment, FN, FP and TP are reported, as shown at 220, to the centralized ESPL service 108. They will be used to improve ESPL technology, and especially the classifier.

According to one embodiment, TN and FP may be used to update the contact model. There are two significant facts when the contact model is updated during the protection phase:

A sliding time window may be used in one embodiment. The size of the sliding time window may be greater than the duration of the learning phase. A sliding time window may be used because it allows for old features of the contact model to be forgotten. For example, the user may have switched from an iPhone to an Android phone. For the contact model to remain representative of the user, the iPhone-related features should be forgotten and the Android-related features should be taken into account. Without a sliding time window, both the iPhone-related and Android-related features would be present, which would decrease the degree to which the contact model is representative of the current behavior of the contact (by, according to one embodiment, increasing dispersion and decreasing the stability of the contact model, as described further below). One embodiment, therefore, uses a sliding time window, to render it dynamic and responsive to changing circumstances and to limit the amount of dispersion, which is discussed further below.

Dispersion may be calculated, according to one embodiment, after the model is updated. If the dispersion is too high, the model may be deactivated.

Figure 3:
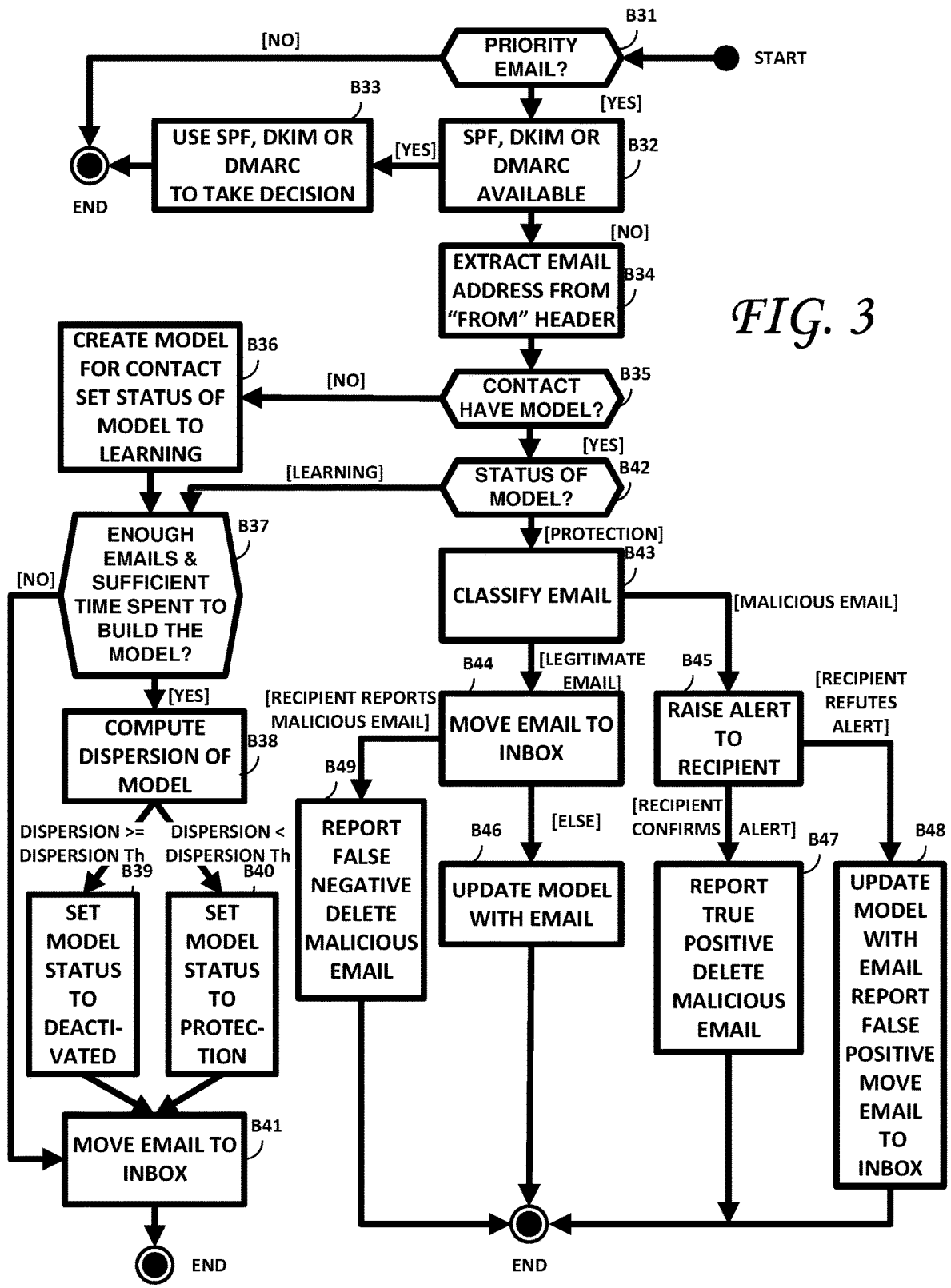
FIG. 3 is a flowchart illustrating aspects of a computer-implemented method according to one embodiment.

FIG. 3 is a flowchart illustrating aspects of a computer-implemented method of classifying and handling inbound emails, according to one embodiment. As shown therein, the computer-implemented method starts with the receipt of an email at a computing device over a computer network. At B31, it is determined whether the received email is a priority (i.e., person-to-person) email. If the received email is not a priority email (such as, for example, spam, advertisements, newsletters, social networks notifications, electronic commerce notifications (such as invoices, booking or purchase confirmation, electronic tickets, parcel tracking)), it may be ignored and the method ends. Alternatively, additional processing, classification and handling of such non-priority emails may be carried out, according to other methods. If the received email is, indeed, determined to be a priority email, (YES branch of B32), it is determined whether SPF, DKIM and/or DMARC are available. If any of these technologies are implemented on the MTA, they may be deployed at B33 and the method ends. One embodiment, therefore, applies to received priority emails in installations in which SPF, DKIM and/or DMARC are not available.

As shown at B34, after following the NO branch of B32, the email address of the sender of the email is extracted from the From header of the received email, as shown at B34. As shown at B35, if a contact model for this sender is available, the YES branch is followed and, if no contact model for this sender exists, then the NO branch of B35 is followed.

Before continuing with a detailed discussion of blocks B36 to B48 of FIG. 3, it is useful to have an understanding of a number of other aspects of ESPL.

Model of a Contact

A contact may be thought of as a person who uses an email address to communicate. This person uses one or several devices (desktop computer, laptop, smartphone, tablet . . . ). For each device, an email application, denoted herein as a Mail User Agent or MUA, may be used to receive, read, compose and send emails. This person also connects from different places. Some of these places can be recurrent (e.g., office, home) or not habitually recurrent (e.g., coffee shop, airport, hotel). All these data may be used, according to one embodiment, to model the contact.

A MUA, according to one embodiment, may be identified by parsing the email, and especially the X-Mailer and User-Agent headers that typically contains an identifier specific to the MUA. However, ESPL may be configured to translate the raw content of the header to a simplified name. Table 1 below contains examples of such translation. This translation is necessary because the raw content contains the version number of the software, and this version number is subject to change quite often because of the frequent updates of the software during its lifecycle. One embodiment of ESPL uses a stable, simplified version of the identification to more readily model the MUA.

TABLE 1

| Raw content | Simplified name |
| --- | --- |
| X-Mailer: iPhone Mail (14C92) | IPHONE_MAIL |
| X-Mailer: iPhone Mail (14A456) | IPHONE_MAIL |
| X-Mailer: iPhone Mail (13D15) | IPHONE_MAIL |
| X-Mailer: Apple Mail (2.3112) | OSX_MAIL |
| X-Mailer: Apple Mail (2.1283) | OSX_MAIL |

Every MUA is configured by the person so that it fits his or her needs, and these configuration elements can help to assemble a digital email fingerprint of the person. Some of these elements can be found by parsing the email. Such elements may include, for example:

the display name;
the signature in the body of the email;
the default font in the text/html part of the body of the email; and
the language.

The display name is the string that will be inserted in the From header of the composed email, just before the email address of the sender. The display name can be configured in the MUA. It is usually the first name and last name of the sender. ESPL can extract the display name by parsing the From header of the email. Below is an example in which the display name "John Miller" has been extracted by parsing the From header of the email:

From: John Miller <john.miller@company.com>

The signature is the signature that will be inserted by default in the body of the email when composing a new message. The signature can contain a great deal of pertinent and useful data, especially in the context of business email: first name, last name, position in the company, address, phone number, and the like. ESPL may be configured to, according to one embodiment, extract the signature by parsing the body of the email. For example:

John Miller
CEO
Company, Inc.
(415) 123-4567

The default font is the font that will be selected by default to compose an email. A font is identified by a font name and a font size. ESPL may be configured to, according to one embodiment, extract the default font by parsing the text/html part of the body of the email. For example:

ARIAL, 10
VERDANA, 11

The language is the language that has been configured in the operating system. The language is transmitted by the MUA in the Content-Language header. The language is stored in the <language>-<REGION> format where <language> is compliant to ISO 639-1 and <REGION> is compliant to ISO 3166-1. ESPL may be configured to, according to one embodiment, extract the language by parsing Content-Language header. For example:

Content-Language: en-US
Content-Language: en-GB
Content-Language: fr-BE
Content-Language: fr-FR When a MTA receives an email, it adds a Received header in the received email. This Received header will typically contain the time, the source IP address and destination IP address of the SMTP connection. ESPL may be configured to, according to one embodiment, extract the IP address that has initiated the sending of the email by parsing these Received headers. ESPL may be also configured to, according to one embodiment, associate a geolocation to the IP address by using a local geolocation database. Geolocation is interesting because it can be less strict than an IP address and still carry a very relevant information. ESPL may be configured to, according to one embodiment, consider the city associated to the IP address. For example, a person may connect from a large list of IP addresses that will be translated to a much smaller list of cities. This makes the modeling of roaming profiles easier.

As a person can use several devices and connect from different places, ESPL may be configured to manage a number of lists for every contact. In one embodiment, ESPL may be configured to maintain three lists for every contact. ESPL, however, may be configured to manage a lesser or greater number of lists. Such lists, for example, may include:

A list of MUA called KNOWN_MUA_LIST and with at most KNOWN_MUA_MAX_COUNT elements;

A list of IP addresses called KNOWN_IP_ADDRESS_LIST and with at most KNOWN_IP_ADDRESS_MAX_COUNT elements; and A list of cities called KNOWN_CITY_LIST and with at most KNOWN_CITY_MAX_COUNT elements.

Dispersion

One embodiment uses dispersion as a measure of the compactness or amount of spread of a distribution of behaviors of a contact relative to electronic messaging. Dispersion (which is also called variability, scatter, or spread) may be characterized as the extent to which a distribution is stretched or squeezed. A measure of statistical dispersion is a nonnegative real number that is zero if all the data are the same and increases as the data become more diverse.

In the present implementation, dispersion is unitless. Examples of dispersion measures include:

Standard deviation;
Interquartile range (IQR);
Range;
Mean absolute difference (also known as Gini mean absolute difference);
Median absolute deviation (MAD);
Average absolute deviation (or simply called average deviation); and
Distance standard deviation.

According to one embodiment, a dispersion value may assist in determining when a contact model in the learning phase should be transitioned to the protection phase and may determine or be a factor in a determination of when a contact model may no longer be useful and should be deactivated. According to one embodiment, a value of dispersion may be calculated for each list. Let us define the following data:

| e | An element |
| $m \in \mathbb{N}, m \geq 2$ | m is a natural number greater or equal to 2 |
| $L_m$ | A list with at least 1 element and at most m elements. |
| M | A model that has one or several lists $L_m$ |
| $disp_{L_m} \in \mathbb{R}, 0 \leq disp_{L_m} \leq 1$ | Dispersion of $L_m$ |
| $disp_M \in \mathbb{R}, 0 \leq disp_M \leq 1$ | Dispersion of M |

Dispersion of $L_m$ is:

$$disp_{L_m} = \frac{card(L_m) - 1}{m - 1}$$

. . . where "card" represents the cardinality (number of elements) of Lm.

Dispersion of M is:

$$disp_M = \frac{\sum_{L_m \in M} disp_{L_m}}{card(M)}$$

A low value of dispersion means that the contact will be easy to model because the contact does not use many devices and/or connection points. Conversely, a high value of dispersion means that the contact will be more difficult to model because the contact uses many devices and/or connection points and, if too high, means that the presently-constructed contact model for this contact may no longer be a useful tool in determining the likelihood of an email spoofing.

Learning Phase

A learning phase is first required to build the model of a contact. According to one embodiment, ESPL may use:

Inbound email traffic to model external contacts; and
Inbound and outbound email traffic to model internal contacts.

The model of the contact will be considered built once the following conditions are both respected:

A condition on the number of emails analyzed; and
A condition on the length of the learning phase When the model is built, the dispersion of the model is computed. If the dispersion is too high, the model is deactivated. For example, a determination of whether the dispersion of a model is too high may include comparing the obtained numerical value of the dispersion against a predetermined dispersion threshold value. If, however, the dispersion value of the model is below the predetermined threshold, the contact model may be activated, the learning phase ended and the protection phase begun.

Dispersion Example

Below is an example of the determination of dispersion, according to one embodiment. In this example, the contact is rebecca.johns@company.com. During the learning phase, it is determined that Rebecca primarily uses Microsoft outlook on her Apple desktop computer. This desktop computer is in her office in San Francisco. Sometimes, however, she uses Mail on her Apple laptop from her home, also in San Francisco. It also happens that she sometimes uses her Apple laptop from her parent's home in San Diego. To sum up:

Rebecca uses two MUA: OSX_OUTLOOK and OSX_MAIL;

Rebecca connects from three different IP addresses: office, home and parent's home; and Rebecca connects from two different cities: San Francisco and San Diego.

The max values may be set as follows (these values may be freely chosen, with the understanding that they will affect the computed dispersion of the contact model):

KNOWN_MUA_MAX_COUNT=4
KNOWN_IP_ADDRESS_MAX_COUNT=32
KNOWN_CITY_MAX_COUNT=8

The dispersion values for the lists are the following:

KNOWN_MUA_DISP=(2−1)/(4−1)=0.3333333333
KNOWN_IP_ADDRESS_DISP=(3−1)/(32−1)= 0.06451612903
KNOWN_CITY_DISP=(2−1)/(8−1)=0.1428571429

The dispersion of the contact model, according to one embodiment, may be computed as the average of the three dispersion values, is:

MODEL_DISP=(KNOWN_MUA_DISP+KNOWN_IP_ADDRESS_DISP+KNOWN_CITY_DISP)/3= 0.18023553507

As can be seen, the dispersion of this model is quite low. It is a steady model, especially because the number of SMTP connection points is very low. Rebecca's range of behaviors, as a contact, are distributed within a quite narrow distribution of such behaviors.

The dispersion threshold is set, in this example, at 0.9. That is, MODEL_DISP_THRESHOLD=0.9. The dispersion of the contact model (0.18023553507) is lower than MODEL_DISP_THRESHOLD (0.9). As the dispersion of the contact model is lower than the dispersion threshold, this contact model can be transitioned from the learning phase to the protection phase.

Protection Phase

Returning to FIG. 2A, during the protection phase, contact models 212 are used, in conjunction with the SVM model 214, to categorize received emails as either likely legitimate or likely malicious, as described in detail herein. Both the SVM model 214 and the contact model may be updated during the protection phase. After the contact model is updated, the dispersion thereof may again be recomputed. If the computed dispersion of the contact model is too high (e.g., higher than a predetermined dispersion threshold), the contact model may be deactivated. If the computed dispersion of the contact model is still lower than the predetermined dispersion threshold, the contact model may be maintained in the protection phase.

Classification

As alluded to above, one embodiment uses a supervised learning algorithm to make the classification decision. Popular supervised learning algorithms include Support Vector Machine (SVM) and Random Forest. In one implementation, SVM may be used to make the decision on a binary classification problem for the following classes:

$C_{malicious}$: the class of email spoofing and spear phishing attacks; and $C_{legitimate}$: the class of legitimate emails.

The SVM classifier may be trained with labeled data i.e. emails that have been classified manually. The training process produces a SVM model. This SVM model will then be used by the SVM classifier to classify an unknown email. The SVM classifier returns the probability $p_{malicious}$ that this email belongs to $C_{malicious}$ class.

We define:

$threshold_{malicious}$: probability threshold where $0.5 \leq threshold_{malicious} \leq 1$; and $v_{email}$: features vector of the email being analyzed.

0.5 is the lower limit for $threshold_{malicious}$ and the threshold default value may be set at 0.95. An email may be considered to be malicious; i.e., is classified to belong to the class $C_{malicious}$ if and only if:

$p_{malicious}(v_{email}) \geq threshold_{malicious}$

According to one embodiment, the $threshold_{malicious}$ may be configurable.

Figure 2B:
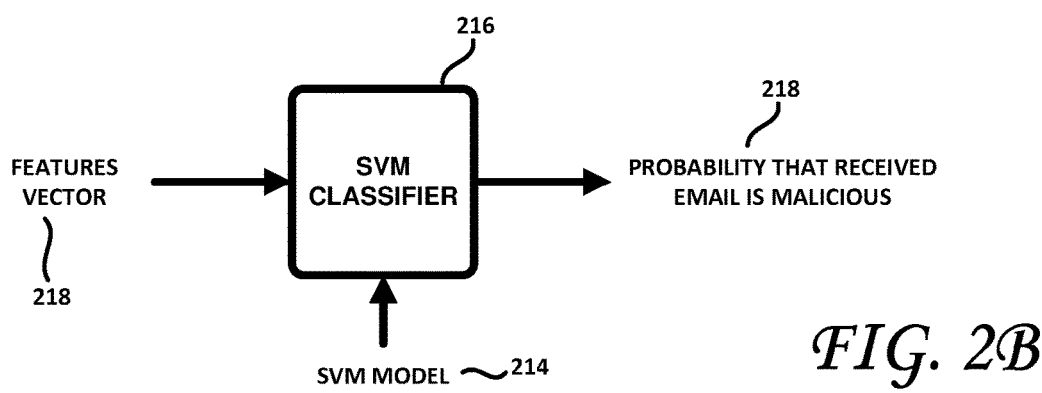
FIG. 2B is a block diagram illustrating aspects of computer-implemented methods, devices and systems, according to one embodiment.

The features vector is a vector of numeric values. As shown in FIG. 2B, this features vector 218, along with the SVM model 214, may be input into the SVM classifier 216, which then outputs a probability 218 that the received email belongs to the malicious class $C_{malicious}$.

As shown, each numeric value of the features vector may be resolved to a value of one of these types:

BIN—A binary value i.e. either 0 or 1. The value equals 1 if the condition is respected, 0 otherwise; and DISP—A dispersion value i.e. a floating number between 0 and 1.

Herein, the main recipient is the internal contact email address protected by ESPL. The features vector, according to one embodiment, may comprise one or more of the binary and dispersion values shown in FIGS. 4A, 4B and 4C. Accordingly, the features vector may comprise a binary value KNOWN_IP_ADDRESS, that is set to 1 (true) if the Internet protocol (IP) address that has initiated the Simple Mail transfer Protocol (SMTP) connection is in KNOWN_IP_ADDRESS_LIST, otherwise it is set to 0 (false). The dispersion value KNOWN_IP_ADDRESS_DISP is representative of the dispersion of KNOWN_IP_ADDRESS_LIST. The binary value KNOWN_CITY is set to 1 (true) if the city associated to the IP address that has initiated the SMTP connection is in KNOWN_CITY_LIST, otherwise it is set to 0 (false). The dispersion value KNOWN_CITY_DISP represents the dispersion of KNOWN_CITY_LIST. The binary value KNOWN MUA is set to 1 (true) if the MUA used to compose the email is in KNOWN_MUA_LIST, otherwise it is set to 0 (false). One embodiment uses a simplified name for the identification of the MUA. Examples of such simplified MUA names include IPHONE_MAIL, IPAD_MAIL, OSX_MAIL and LINUX_THUNDERBIRD. As shown in FIG. 4A, the dispersion value KNOWN_MUA_DISP is the dispersion of the KNOWN_MUA_LIST.

The features vector, according to one embodiment, may also include a binary value KNOWN_MUA_DISPLAY_NAME, which is the display name extracted from the From header and matches the display name of the identified MUA. See KNOWN_MUA. The binary value KNOWN_MUA_SIGNATURE is the signature extracted from the body of the email and matches the signature of the identified MUA. See KNOWN_MUA. The binary value KNOWN_MUA DEFAULT_FONT represents the font extracted from the text/html part of the body of the email and matches the default font of the identified MUA. See KNOWN_MUA. The features vector may also include a binary value for KNOWN_MUA_CONTENT_LANGUAGE, which is the language extracted from Content-Language header, which must match the language of the identified MUA. See KNOWN_MUA. The binary value NEW_MESSAGE is set or reset depending upon whether the email is a newly composed message; i.e., the email is neither a reply to a previous message nor a forward of an existing message. In the case of a reply or a forward, the email can take attributes—such as the font and the language—of the existing message. See KNOWN_MUA_DEFAULT_FONT_and KNOWN_MUA_CONTENT_LANGUAGE.

As shown in FIG. 4B, the features vector may also include a binary value for TEXT_HTML_PART, which indicates whether the email body has a text/html part. A text/html part in the body is required to extract the font. See KNOWN_MUA_DEFAULT_FONT. The features vector may also include a binary WHP_IP_ADDRESS value, which indicates whether the IP address that has initiated the SMTP connection belongs to a web hosting provider (such as, for example, GoDaddy, OVH, 1&1 and the like). Web hosting providers are often abused by fraudsters to send malicious emails such a spear phishing attacks. A web hosting provider IP address may be identified by, for example, analyzing and matching the reverse DNS of the IP address with a known pattern, and/or by matching the IP address with of list of IP ranges that belong to the web hosting provider. As shown in FIG. 4B, the features vector may also include a binary value DIFFERENT_REPLY_TO, which is a value that indicates that the email address in the Reply-To header does not match the email address in the From header. In the case of a spear phishing, the fraudster often set a different email address in Reply-To header. If the victim replies to the email, then his or her reply will not go to the person whose email has been spoofed, but to the fraudster instead or to an email address designated by the fraudster.

A binary value DIFFERENT_RETURN_PATH may also be included in the features vector. The condition that must be satisfied for this binary value is that the email address in the Return-Path header does not match the email address in the From header. The Return-Path header contains the email address that will receive a bounce message in the case of a delivery issue. The Return-Path header is added to the received email by the MTA and the MTA uses the email address of the MAIL FROM SMTP command. In the case of a spear phishing, the fraudster often sets an email address in the MAIL FROM SMTP command that is different from the email address in the From header, resulting in the email addresses in the Return-Path being different from the From headers. The binary SINGLE_RECIPIENT value indicates that there is one recipient in To header and no recipient in Cc and Bcc headers. This recipient is the main recipient. In the case of a spear phishing attack, it is common that only one person is targeted. If several persons were targeted or otherwise present in the Cc or Bcc headers, the chances of the scam being discovered would increase greatly. Hence, spear phishing attacks often are directed to a single person.

As shown in FIG. 4C, the binary URGENCY_IN_SUBJECT value indicates that the email Subject header contains a keyword that creates a sense of urgency such as, for example, urgent, important, critical and the like. A large number of spear phishing attacks attempt to create a false sense of urgency so that the victim acts immediately, without much aforethought. See the CEO fraud example developed above. A SUSPICIOUS_TEXT binary value may also be included in the features vector. This value may be set to 1 if the email body is determined to contain language indicative of topics which are deemed to be of a suspicious nature. Examples of such may include, for example, wire transfer, disclosure of sensitive and/or confidential data (contracts, internal documents, bank account numbers, social security numbers, W-2 tax records, list of logins or passwords . . . ) and the like.

The features vector may also include the binary value EXTERNAL_DATA, which may be set to logical 1 if the email body contains at least one external data: an email address, a telephone number, a URL or an attached dynamic file. Significantly, according to one embodiment, the signature in the body may be ignored, as it may contain an email address, telephone numbers and URLs. A dynamic file is a file that may contain dynamic content that can be harmful. Examples of dynamic files are PE files, APK files, Javascript files, PDF files, Microsoft Office files or HTML files. Some dynamic files may be compressed. Indeed, harmful files are frequently hidden in compressed archives (.zip, .rar and the like). Dynamic files may be identified by their media type. In this case of a spear phishing attack, this external data can be the next step of the attack or the payload: a phishing URL that will capture the victim credentials, a file that contains a malware.

Returning now to FIG. 3, after extracting the email address from the From header of the received email as shown at B34, it is determined at B35 whether the extracted email address has a corresponding contact model. If no contact model for the extracted email address exists (NO branch of B35), a contact model is created for the recipient of the extracted email and the status of the just-created contact model is set at "Learning", according to one embodiment and as shown at B36. At B37, it may be determined, according to one embodiment, whether sufficient emails have been examined and whether sufficient time has elapsed to build the contact model. For example, it may be determined whether a sufficient number of values for some or all of the elements of the features vector have been determined to construct a useful contact model for the extracted email address. If the contact model has not yet been built (NO branch of B37), the received email may be simply moved to the recipient's email inbox (or to a special inbox configured for emails that have not been classified), as no spear phishing detection may be carried out without a fully-constructed contact model. If, however, a sufficient number of emails and sufficient time have elapsed to fully build the contact model for the extracted email (YES branch of B37), the dispersion of the contact model may be computed, as shown at B38 and as detailed herein.

According to one embodiment, if the dispersion of the contact model computed in B38 is greater or equal to a dispersion threshold block B39 may be performed. If the computed dispersion threshold is greater to or equal to the dispersion threshold, B39 may be carried out, and the contact model may be deactivated, meaning that the email recipient is not amenable to being accurately modeled in a manner that will be useful in detecting spear phishing attacks. Such may be the case where the email recipient emails from too many devices, from too many locations, uses different email clients and platforms, for example, such that an accurate contact model cannot be constructed. If, however, the dispersion computed in B38 is less than the dispersion threshold, the contact model may be transitioned from the "Learning" phase to the "Protection" phase as shown at B40, meaning that the contact model becomes operational and may be used to detect spear phishing attacks, according to one embodiment. Whether B39 or B40 is carried out, the received email may be moved to the recipient's email inbox, as shown at B41, whereupon, at least for this received email, the method ends.

Returning to block B35, if a contact model for the email recipient exists (Yes branch of B35), the status of the model is determined at B42. If the status of the contact model for the email recipient is still "Learning", the method reverts to B37 and proceeds as described above. If, however, the contact model for the email recipient has transitioned to the "Protection" phase, block B43 may be carried out, where the incoming email is classified as likely malicious or likely non-malicious, in the manner described relative to FIG. 2B, for example. If the classification indicates that the received email is likely legitimate, the received email may be moved to the recipient's inbox as shown at B44. According to one embodiment, if the user, after having read the email or even without reading the email, reports that the received email is likely malicious, a false negative (FN) may be reported to the centralized ESPL service 108, the SVM model may be updated, as may be the code that builds the features vector and/or the code that builds the contact model, as generally shown at 222 in FIG. 2A, and the email deleted as shown at B49. The method, at least for this received email, then ends. If the user does not report a false negative for this email, the contact model for this recipient may be updated as shown at B46 and the method then ends, for this email.

If the classification at B43 indicates that the received email is likely malicious, the email recipient may then be alerted as shown at B45. If the email recipient agrees with the classification of the received email as likely malicious, B47 may be carried out, a true positive (TP) is reported to the ESPL service 108, and the malicious received email may be deleted, as shown at B47. Herein, deleting a likely malicious email may also be understood as moving the identified malicious email to a safe location, quarantining the received email or taking other action that sequesters the received email so that it does no harm and is separated from other, legitimate received emails. Following B47, the method then ends, at least for this received email. Following a classification of the received email as likely malicious in B43, the user may refute the classification, and report instead that the received email is, in fact, legitimate. If the user reports that a received email that has been classified as likely malicious is, in fact, legitimate, the contact model may be updated and the dispersion thereof re-calculated. The SVM model 214 may be periodically updated on the centralized ESPL server, after collecting FP, FN, TP, whereupon the ESPL components may be updated with the new, updated SVN model. The email may then be moved to the recipient's email inbox, whereupon the method ends, for this email. The method shown in FIG. 3 may be repeated, at least in part, upon receipt of each email, to protect the intended recipient from phishing attacks.

The dispersion threshold, according to one embodiment, may be a static or a dynamic parameter. Setting a higher dispersion threshold will result in fewer contact models being deactivated and fewer emails being classified as likely to be malicious. Conversely, setting a lower dispersion threshold will result in fewer contact models switching from the "learning" status to the "protection" status, and the False Positive (FP) rate may increase.

FIG. 5 is a table that classifies the constituent elements of the features vector according to one embodiment, according their intended use. The first row of the table of FIG. 5 lists exemplary features vector elements that may be used to detect email spoofing, whereas the second row of the table of FIG. 5 lists features vector elements that may find utility in detecting spear phishing. That is, features vector elements that may be used to detect email spoofing may include:
    KNOWN_IP_ADDRESS;
    KNOWN_IP_ADDRESS_DISP;
    KNOWN_CITY;
    KNOWN_CITY_DISP;
    KNOWN_MUA;
    KNOWN_MUA_DISP;
    KNOWN_MUA_DISPLAY_NAME;
    KNOWN_MUA_SIGNATURE;
    KNOWN_MUA_DEFAULT_FONT;
    KNOWN_MUA_CONTENT_LANGUAGE;
    NEW_MESSAGE; and
    TEXT_HTML_PART Features vector elements that may be used to detect spear phishing may include:
    WHP_IP_ADDRESS;
    DIFFERENT_REPLY_TO;
    DIFFERENT_RETURN_PATH;
    SINGLE_RECIPIENT;
    URGENCY_IN_SUBJECT;
    SUSPICIOUS_TEXT; and
    EXTERNAL_DATA The above lists are presented herein for exemplary purposes only, it being understood that neither of these lists are presented as exhaustively listing all possible features vector elements, nor must all elements be present to enable the detection of email spoofing and/or a spear phishing attack. Moreover, one or more of the elements listed as being useful in detecting email spoofing may provide additional insight in a spear phishing attack and one or more elements listed as being useful in detecting a spear phishing attack may similarly provide insight into the detection of email spoofing.

Figure 6:
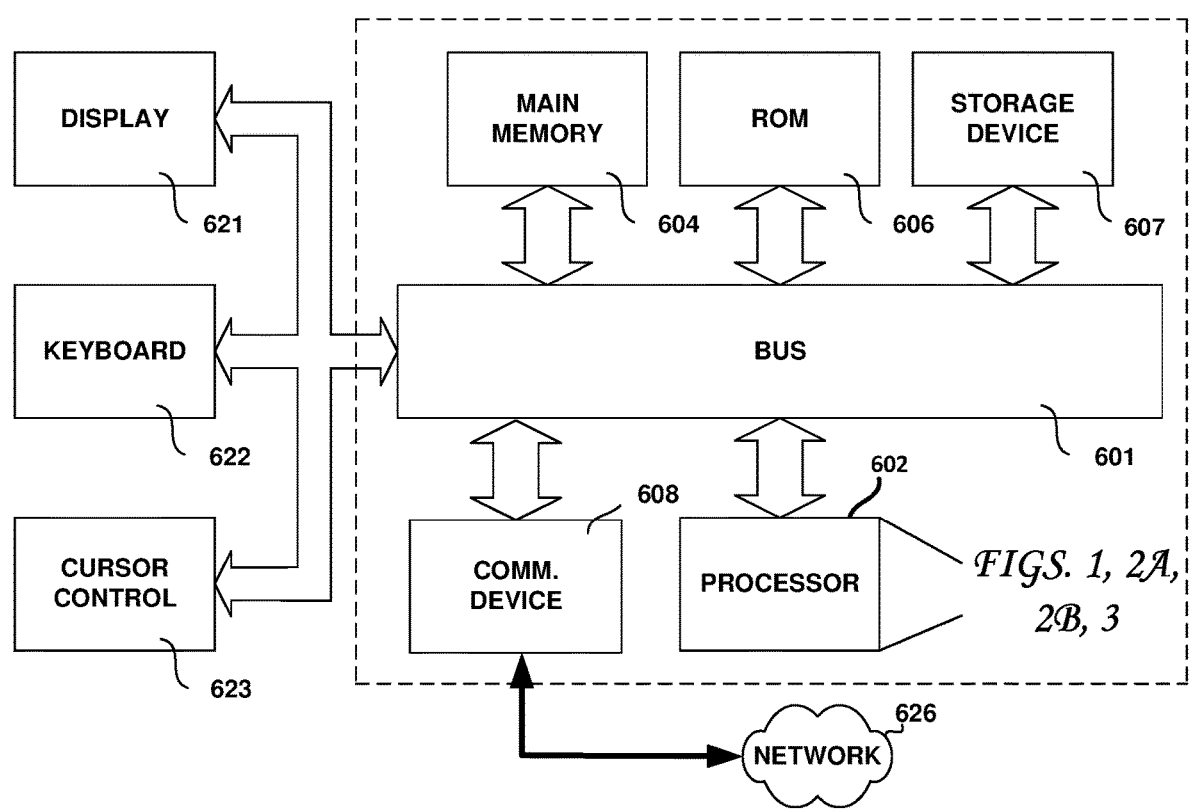
FIG. 6 is a block diagram of a computing device with which an embodiment may be practiced.

FIG. 6 illustrates a block diagram of a computing device such as client computing device, email (electronic message) server, with which embodiments may be implemented. The computing device of FIG. 6 may include a bus 601 or other communication mechanism for communicating information, and one or more processors 602 coupled with bus 601 for processing information. The computing device may further comprise a random-access memory (RAM) or other dynamic storage device 604 (referred to as main memory), coupled to bus 601 for storing information and instructions to be executed by processor(s) 602. Main memory (tangible and non-transitory, which terms, herein, exclude signals per se and waveforms) 604 also may be used for storing temporary variables or other intermediate information during execution of instructions by processor 602. The computing device of FIG. 6 may also include a read only memory (ROM) and/or other static storage device 606 coupled to bus 601 for storing static information and instructions for processor(s) 602. A data storage device 607, such as a magnetic disk and/or solid state data storage device may be coupled to bus 601 for storing information and instructions—such as would be required to carry out the functionality shown and disclosed relative to FIGS. 1-5. The computing device may also be coupled via the bus 601 to a display device 621 for displaying information to a computer user. An alphanumeric input device 622, including alphanumeric and other keys, may be coupled to bus 601 for communicating information and command selections to processor(s) 602. Another type of user input device is cursor control 623, such as a mouse, a trackball, or cursor direction keys for communicating direction information and command selections to processor(s) 602 and for controlling cursor movement on display 621. The computing device of FIG. 6 may be coupled, via a communication interface (e.g., modem, network interface card or NIC) to the network 626.

Embodiments of the present invention are related to the use of computing devices to detect phishing attacks in electronic messages such as emails. According to one embodiment, the methods, devices and systems described herein may be provided by one or more computing devices in response to processor(s) 602 executing sequences of instructions contained in memory 604. Such instructions may be read into memory 604 from another computer-readable medium, such as data storage device 607. Execution of the sequences of instructions contained in memory 604 causes processor(s) 602 to perform the steps and have the functionality described herein. In alternative embodiments, hard-wired circuitry may be used in place of or in combination with software instructions to implement the described embodiments. Thus, embodiments are not limited to any specific combination of hardware circuitry and software. Indeed, it should be understood by those skilled in the art that any suitable computer system may implement the functionality described herein. The computing devices may include one or a plurality of microprocessors working to perform the desired functions. In one embodiment, the instructions executed by the microprocessor or microprocessors are operable to cause the microprocessor(s) to perform the steps described herein. The instructions may be stored in any computer-readable medium. In one embodiment, they may be stored on a non-volatile semiconductor memory external to the microprocessor, or integrated with the microprocessor. In another embodiment, the instructions may be stored on a disk and read into a volatile semiconductor memory before execution by the microprocessor.

While certain example embodiments have been described, these embodiments have been presented by way of example only, and are not intended to limit the scope of the embodiments disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

The invention claimed is:

1. A computer-implemented method of detecting an email spear phishing attack, comprising:
during a learning phase,
using a sliding time window and emails received from a sender, building a model of a contact of the sender of emails, the contact model being representative of a behavior of the contact and being configured to transition from the learning phase to a protection phase after expiration of the learning phase when a spread of distribution of data in the contact model is below a predetermined threshold;
during the protection phase,
receiving, over a computer network, an email from the sender;
using the built contact model, making a classification decision to classify the email received from the sender as likely legitimate or likely malicious;
notifying a recipient of the email when the received email is classified as a likely malicious email spear phishing attack; and
periodically updating the contact model using a sliding time window by:
adding data to the contact model from recent received emails from the sender, and
deleting data from the contact model from emails older than a predetermined period of time.

2. The computer-implemented method of claim 1, wherein the contact model includes data representative of at least one device with which the sender sends emails, at least one email application with which the sender sends emails, and at least one location from which the sender sends emails.

3. The computer-implemented method of claim 1, wherein making the classification decision comprises using a supervised learning algorithm to make the classification decision.

4. The computer-implemented method of claim 1, wherein making the classification decision comprises:
evaluating the received email against a plurality of conditions associated with spear phishing attacks to generate a features vector, the features vector comprising a plurality of numeric values and a plurality of dispersion values between 0 and 1; and
using at least the generated features vector and the built contact model to classify the received email as a likely legitimate email or as a likely malicious email spear phishing attack.

5. The computer-implemented method of claim 4, wherein the spread of distribution of data in the contact model comprises a statistical dispersion measure comprising an average of the plurality of dispersion values.

6. The computer-implemented method of claim 4, wherein the features vector comprises at least one numeric value indicative that:
the internet protocol (IP) address that sent the received email belongs to a web hosting provider;
the email address in the Reply-To header of the received email does not match the email address in the From header of the received email;
the email address in the Return-Path header of the received email does not match the email address in the From header of the received email;
there is one recipient in the To header and no recipient in the Cc and Bcc headers of the received email;
the Subject header of the received email contains at least one keyword intended to create a sense of urgency;
the received email contains language indicative of topics that are deemed to be of a suspicious nature; and
the received email contains at least one of an email address, a telephone number, a URL and an attached dynamic file.

7. The computer-implemented method of claim 1, wherein the built contact model is not used to classify the received email as likely legitimate or likely malicious when the spread of distribution of data in the contact model is greater than or equal to the predetermined threshold.

8. The computer-implemented method of claim 1, wherein periodically updating further comprises updating the contact model using data from emails received from the sender that are determined to be true negatives (TN) and false positives (FP).

9. The computer-implemented method of claim 1, wherein building the contact model comprises:
extracting an identification of an email application used to send the received email;
simplifying the extracted identification; and
storing the extracted and simplified identification in the contact model.

10. The computer-implemented method of claim 9, wherein simplifying the extracted identification comprises at least stripping a software version number from the extracted identification of the email application used to send the received email.

11. A computing device comprising:
at least one processor;
at least one data storage device coupled to the at least one processor;
a network interface coupled to the at least one processor and to a computer network;

a plurality of processes spawned by said at least one processor, the processes including processing logic for:

during a learning phase,
using a sliding time window and emails received from a sender, building a model of a contact of the sender of emails, the contact model being representative of a behavior of the contact and being configured to transition from the learning phase to a protection phase after expiration of the learning phase when a spread of distribution of data in the contact model is below a predetermined threshold;

during the protection phase,
receiving, over the computer network, an email from the sender;
using the built contact model, making a classification decision to classify the email received from the sender as likely legitimate or likely malicious;
notifying a recipient of the email when the received email is classified as a likely malicious email spear phishing attack; and
periodically updating the contact model using a sliding time window by:
adding data to the contact model from recent received emails from the sender, and
deleting data from the contact model from emails older than a predetermined period of time.

12. The computing device of claim 11, wherein the contact model includes data representative of at least one device with which the sender sends emails, at least one email application with which the sender sends emails, and at least one location from which the sender sends emails.

13. The computing device of claim 11, wherein the processing logic for making the classification decision further comprises processing logic for using a supervised learning algorithm to make the classification decision.

14. The computing device of claim 11, wherein the processing logic for making the classification decision further comprises processing logic for:
evaluating the received email against a plurality of conditions associated with spear phishing attacks to generate a features vector, the features vector comprising a plurality of numeric values and a plurality of dispersion values between 0 and 1; and
using at least the generated features vector and the built contact model to classify the received email as a likely legitimate email or as a likely malicious email spear phishing attack.

15. The computing device of claim 14, wherein the spread of distribution of data in the contact model comprises a statistical dispersion measure comprising an average of the plurality of dispersion values.

16. The computing device of claim 14, wherein the features vector comprises at least one numeric value indicative that:
the internet protocol (IP) address that sent the received email belongs to a web hosting provider;
the email address in the Reply-To header of the received email does not match the email address in the From header of the received email;
the email address in the Return-Path header of the received email does not match the email address in the From header of the received email;
there is one recipient in the To header and no recipient in the Cc and Bcc headers of the received email;
the Subject header of the received email contains at least one keyword intended to create a sense of urgency;
the received email contains language indicative of topics that are deemed to be of a suspicious nature; and
the received email contains at least one of an email address, a telephone number, a URL and an attached dynamic file.

17. The computing device of claim 11, wherein the built contact model is not used to classify the received email as likely legitimate or likely malicious when the spread of distribution of data in the contact model is greater than or equal to the predetermined threshold.

18. The computing device of claim 11, wherein the processing logic for periodically updating further comprises processing logic for updating the contact model using data from emails received from the sender that are determined to be true negatives (TN) and false positives (FP).

19. The computing device of claim 11, wherein the processing logic for building the contact model comprises processing logic for:
extracting an identification of an email application used to send the received email;
simplifying the extracted identification; and
storing the extracted and simplified identification in the contact model.

20. The computing device of claim 19, wherein the processing logic for simplifying the extracted identification comprises processing logic for at least stripping a software version number from the extracted identification of the email application used to send the received email.

21. The computing device of claim 11, configured as a local email gateway coupled to the computer network.

22. The computing device of claim 11, configured as a remote server accessible over the computer network.

* * * * *